April 21, 1953  L. E. GODFRIAUX ET AL  2,635,326
AUTOMATIC TURRET INDEXING MECHANISM FOR LATHES
Filed July 2, 1947  5 Sheets-Sheet 1

Louis E. Godfriaux
Charles H. Johnson
INVENTORS:

BY
ATTORNEY.

Louis E. Godfriaux
Charles H. Johnson
INVENTORS

April 21, 1953 L. E. GODFRIAUX ET AL 2,635,326
AUTOMATIC TURRET INDEXING MECHANISM FOR LATHES
Filed July 2, 1947 5 Sheets-Sheet 3

Louis E. Godfriaux
Charles H. Johnson
INVENTORS

BY *Elwin C. Andrus*
ATTORNEY.

April 21, 1953 L. E. GODFRIAUX ET AL 2,635,326
AUTOMATIC TURRET INDEXING MECHANISM FOR LATHES
Filed July 2, 1947 5 Sheets-Sheet 4

Louis E. Godfriaux
Charles H. Johnson
INVENTORS.

BY *[signature]*
ATTORNEY.

April 21, 1953    L. E. GODFRIAUX ET AL    2,635,326
AUTOMATIC TURRET INDEXING MECHANISM FOR LATHES
Filed July 2, 1947    5 Sheets-Sheet 5

Louis E. Godfriaux
Charles H. Johnson
INVENTORS.

BY *Edwin A. Andrus*
ATTORNEY.

Patented Apr. 21, 1953

2,635,326

UNITED STATES PATENT OFFICE 2,635,326

AUTOMATIC TURRET INDEXING MECHANISM FOR LATHES

Louis E. Godfriaux and Charles H. Johnson, Madison, Wis., assignors to Gisholt Machine Company, Madison, Wis., a corporation of Wisconsin Application July 2, 1947, Serial No. 758,500

6 Claims. (Cl. 29—50)

1

This invention relates to an automatic turret indexing mechanism for lathes.

The principal object of the invention is to provide a simple power driven indexing mechanism for a turret.

Another object of the invention is to provide a compact mechanism within the base of the turret for operating the lock bolt, the clamp ring and the indexing of the turret from a single drive shaft.

Another object is to provide a Geneva movement indexing mechanism for the turret in which the Geneva plate is secured to the bottom of the turret beneath the same, thereby leaving the inside of the turret substantially open and free for the clamping of tool supports and the like.

Another object is to provide a simple and more dependable mechanism for operating the lock bolt for the turret.

Another object is to provide an enclosed and more dependable and compact mechanism for operating the clamp ring for the turret.

Another object is to provide a more dependable and improved clutch mechanism for operating the rotary indexing shaft for the turret and to eliminate dependence upon the movement of the turret carriage to carry out the indexing operation.

Another object is to utilize movement of the turret carriage to initiate indexing and to utilize the drive motor for the lathe to effect the indexing of the turret.

Other objects of the invention will appear in the description of an embodiment of the invention illustrated in the drawings.

Figure 1:
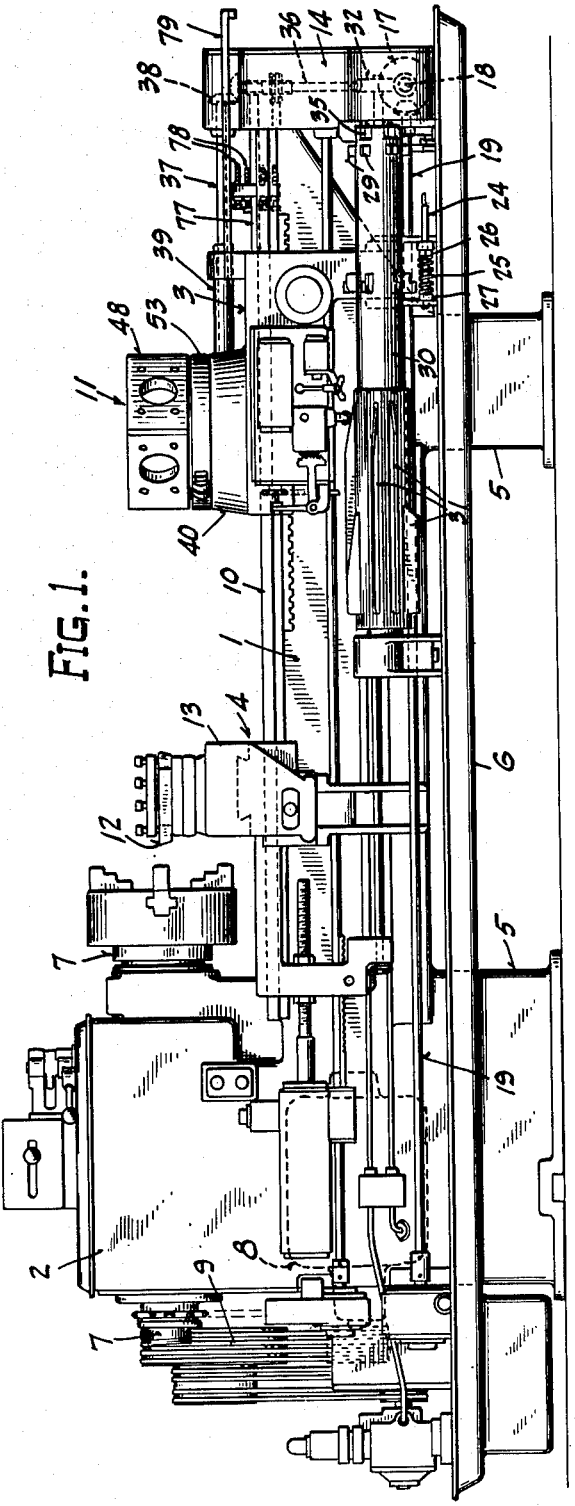
Figure 1 is a side elevation of an automatic lathe embodying the invention.
Figure 2:
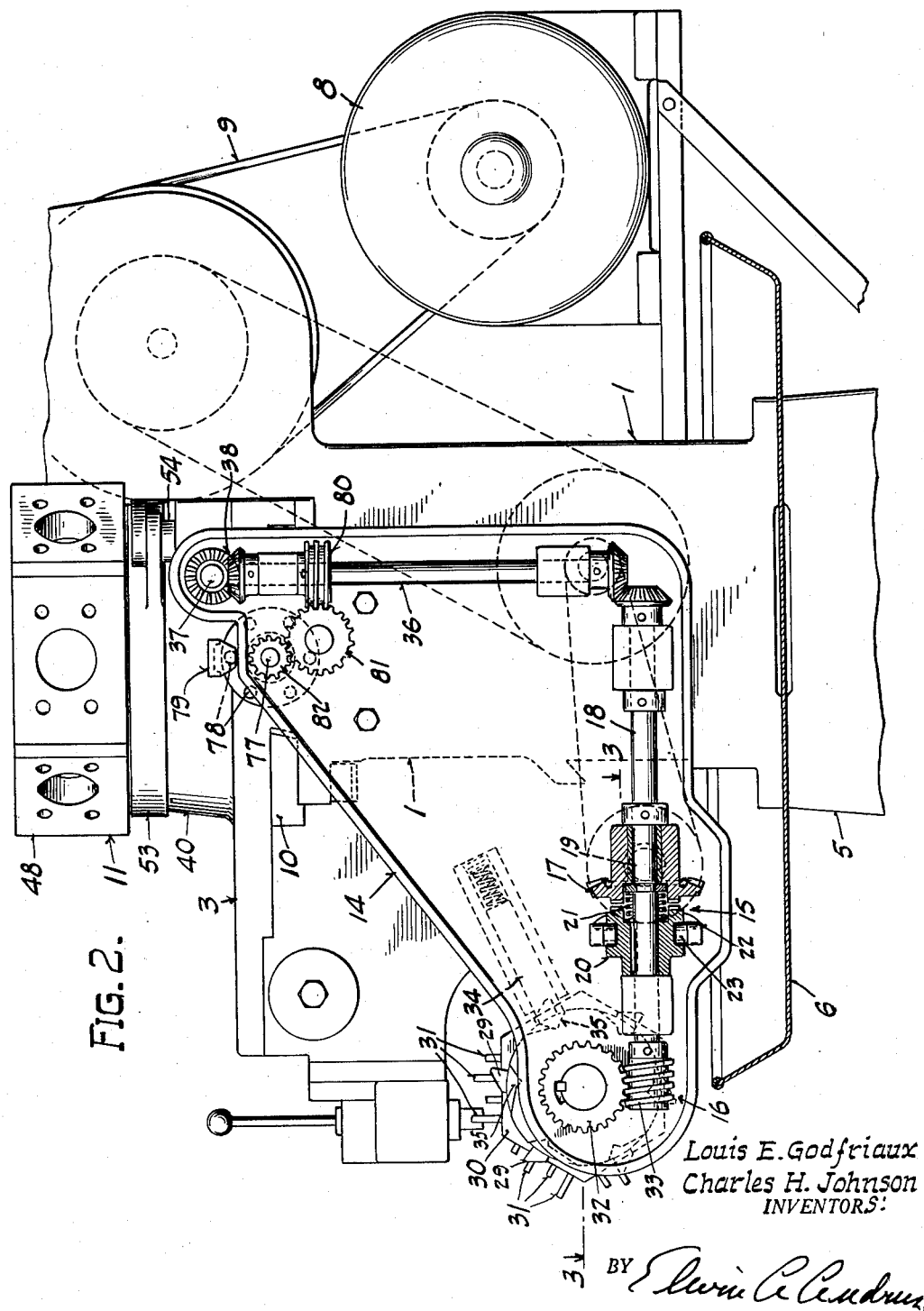
Figure 2 is an enlarged rear end elevation of the lathe showing the index drive.
Figure 3:
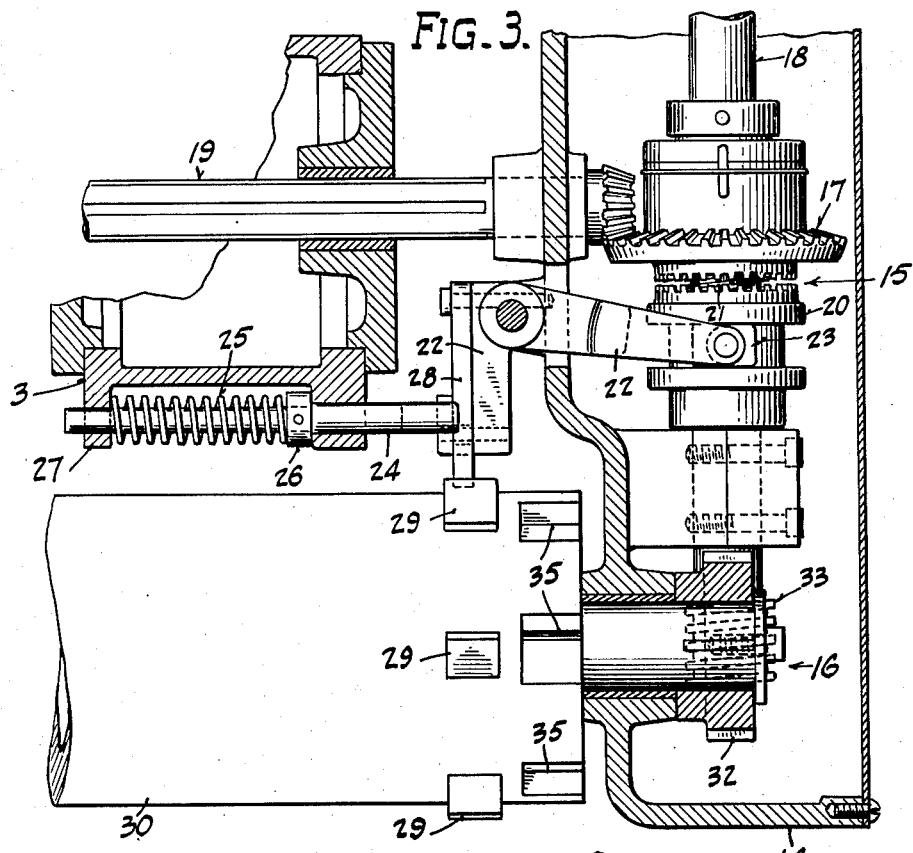
Fig. 3 is a horizontal section taken on line 3—3 of Fig. 2 and showing the index clutch and drive.
Figure 4:
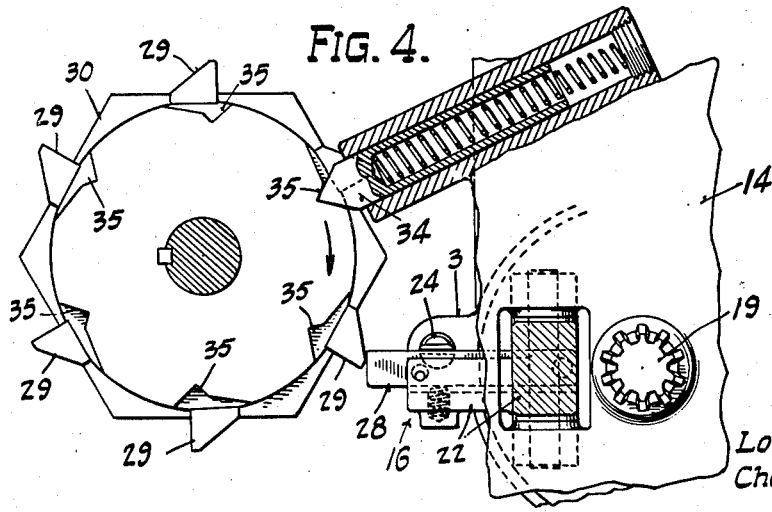
Fig. 4 is a detail view showing the trip control.
Figure 5:
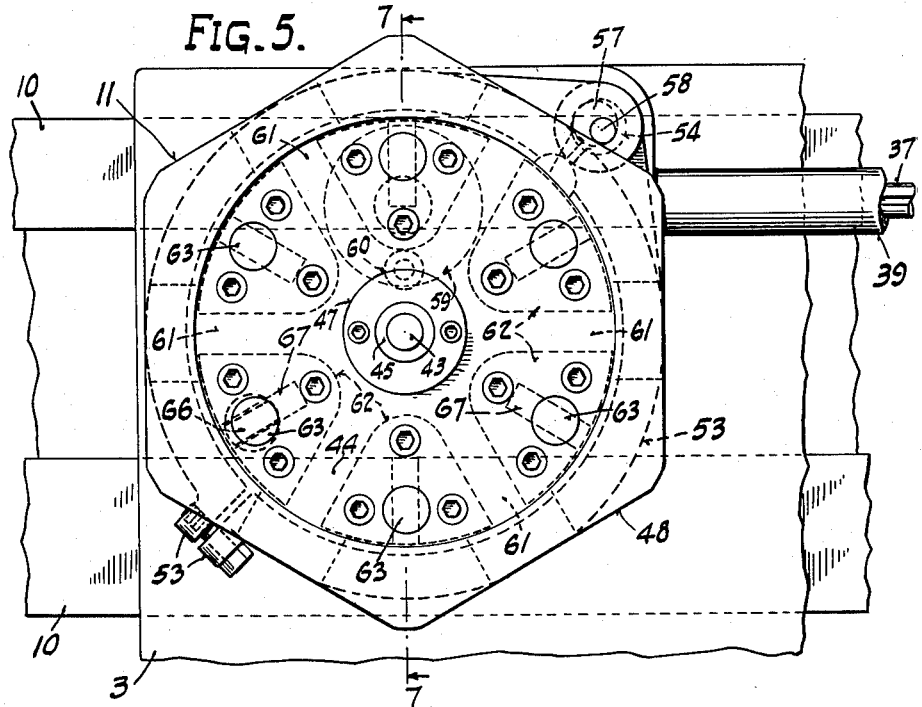
Fig. 5 is a top plan view of the turret and adjacent parts of the lathe.
Figure 6:
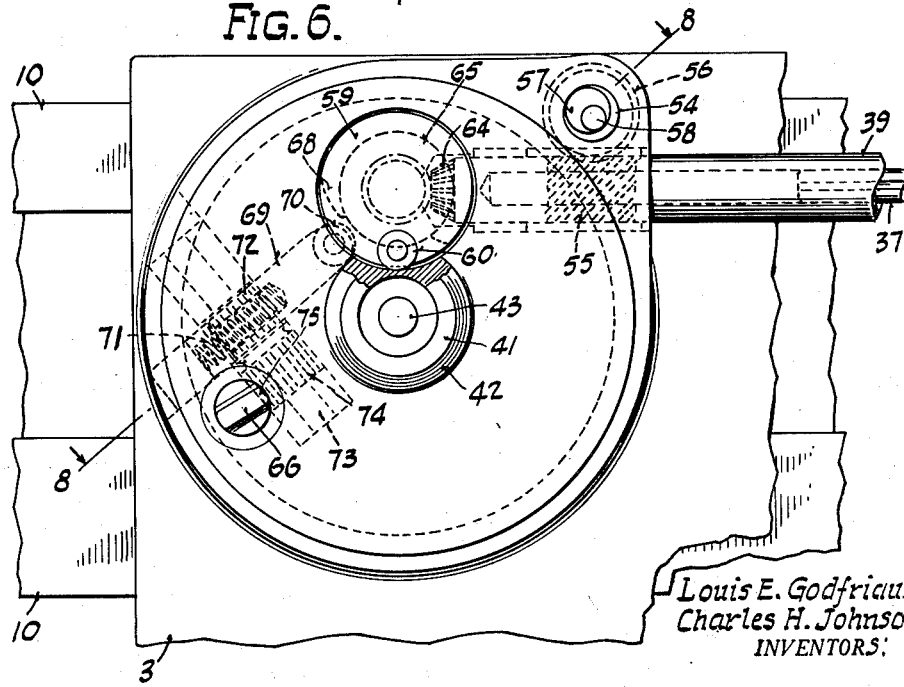
Fig. 6 is a top plan view of the turret base with the turret removed and parts broken away and sectioned.
Figure 7:
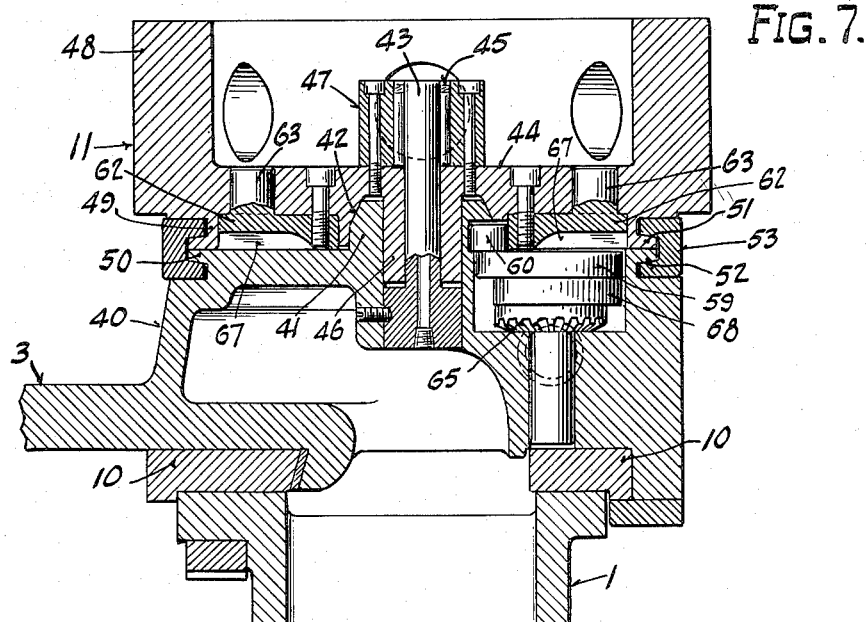
Fig. 7 is a vertical section through the turret and its base taken on the line 7—7 of Fig. 5 and showing the Geneva movement mechanism.
Figure 8:
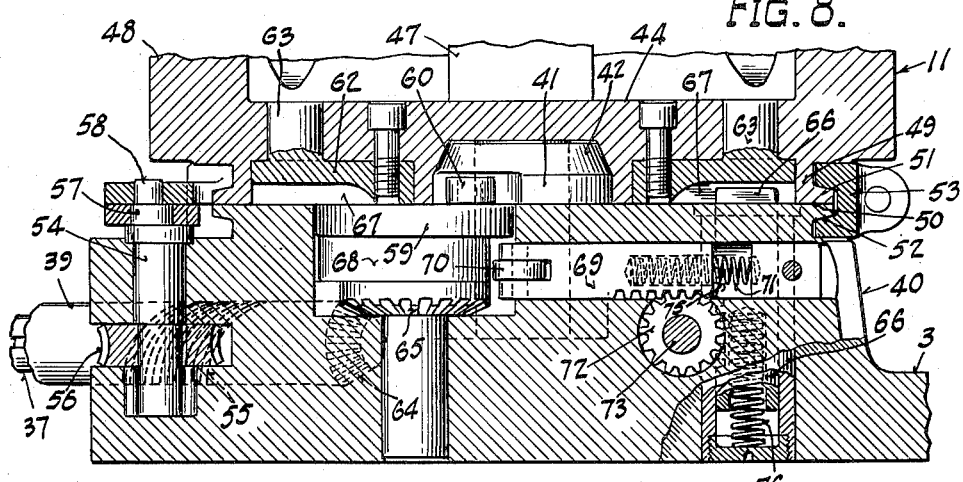
Fig. 8 is a detail vertical sectional view taken on broken line 8—8 of Fig. 6 showing the mechanism for operating the turret clamp and lock bolt.
Figure 9:
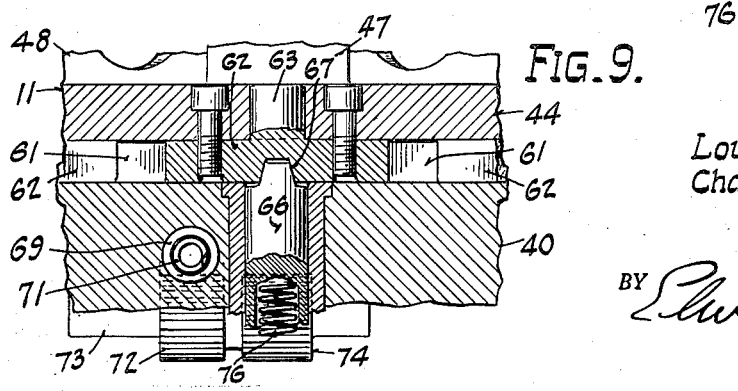
Fig. 9 is a detail sectional view showing the locking pin construction.

The lathe illustrated in the drawing is substantially the same as that set forth in the copending application of Louis E. Godfriaux, Serial No. 597,268, filed June 2, 1945, for Automatic Turret Lathe, and which issued to Patent No. 2,565,305 on August 21, 1951.

The lathe comprises a bed 1, headstock 2, turret carriage 3 and tool post carriage 4.

The bed 1 extends for the length of the lathe and is supported on legs 5 with a chip and coolant pan 6 extending around the same at a position spaced from the floor.

The headstock 2 extends upwardly at the lefthand end of the bed 1 and contains the gear change mechanism for driving the spindle 7 mounted for rotation therein. A motor 8 drives the headstock by means of belt 9.

The turret carriage 3 is mounted on ways 10 on bed 1 for reciprocation longitudinally of the bed in a direction parallel to the spindle 7. A turret 11 is mounted on carriage 3 and is adapted to be rotated on a vertical axis to different indexed positions presenting successive faces toward the spindle.

The tool carriage 4 is mounted on the ways 10 between carriage 3 and the headstock 2 and carries a tool post 12 on a cross slide 13 adapted to move transversely of spindle 7.

The present invention is directed to the mechanism for automatically indexing the turret 11 upon reciprocation of carriage 3 as set forth in the copending application referred to above.

For this purpose, the bed 1 has a housing 14 at its rear end containing a clutch mechanism 15 and trip 16 for indexing the turret. The clutch mechanism may be of any suitable type such as a toothed clutch such as that shown or a ball clutch, or the like.

The clutch mechanism 15 illustrated has a geared clutch member 17 rotatably mounted on a transverse shaft 18 and driven by a beveled gear on the rear end of the traverse shaft 19. The shaft 19 extends to the forward end of the lathe and is driven by the motor 8.

The clutch mechanism 15 also has a driven element 20 axially movable on shaft 18 and keyed to rotate the shaft 18 when the element 20 is moved into clutching engagement with clutch member 17. A spring 21 is disposed in the clutch to normally hold clutch element 20 out of engagement with clutch member 17.

The trip 16 for opening and closing the clutch 15 has a bell crank lever 22 pivoted in the front wall of housing 14, with one arm bifurcated and pivoted to shoes 23 riding freely in a circumferential groove in clutch element 20, and with its other arm extending transversely of the lathe in the path of movement of a push rod 24 on carriage 3, so that when carriage 3 is retracted rearwardly from a machining operation, rod 24 engages lever 22 and moves clutch element 20 into clutching engagement with clutch member 17 against spring 21.

The rod 24 is spring pressed rearwardly toward the lever 22 by spring 25 disposed between a flange 26 or cross pin on the rod and a fixed supporting lug 27 on carriage 3, so that the carriage may have limited movement rearwardly after rod 24 reaches its limit of movement in closing clutch 15.

The closing of clutch 15 effects driving of shaft 18 by shaft 19 and thereby operates the indexing mechanism for turret 11. The clutch 15 is opened by spring 21 upon release of the lever 22 after a predetermined rotation of shaft 18 has effected the indexing of the turret.

The release of clutch lever 22 may be effected in different ways. One mechanism for releasing the clutch is illustrated in the copending application above referred to. Another mechanism is illustrated herein.

The release mechanism shown employs a trip arm 28 pivoted on the rear arm of lever 22 and supported in a slot therein by a vertical spring for limited downward movement. The arm 28 normally extends above the level of arm 22 and is the member engaged by the end of rod 24. Downward movement of arm 28 disengages it from rod 24 and releases the latter and also the lever 22.

The trip arm 28 is operated to release clutch 15 by means of a dog 29 on the control drum 30 provided for controlling the feeding movements of the lathe. The control drum 30 is driven and indexed by the transverse shaft 18 in correlation to the indexing of the turret 11.

The control drum 30 extends along the front of bed 1 adjacent the path of movement of carriage 3 and has a plurality of control faces corresponding to the index faces of turret 11 and which carry cams 31 for controlling various lathe movements.

The indexing drive for control drum 30 comprises a gear 32 on the rear end of the drum shaft in housing 14 and which meshes with a worm gear 33 on the left end of shaft 18.

A separate dog 29 is provided for each control face of drum 30 to terminate the indexing movement of the drum and turret by tripping arm 28 downwardly upon completion of the indexing operation in each instance.

Where one or more faces of the turret are to be inactive, the dog 29 corresponding to the index position of the face should be removed so that the indexing mechanism will continue through from one to another cycle of operation before being tripped by the next dog, thereby skipping the inactive turret face.

The gear 32 has a lost motion connection to the drum shaft, permitting the drum to be accurately located at each indexed position by means of a spring pressed lock pin 34 entering a recess 35 in the surface of the drum.

The indexing of turret 11 is effected by the predetermined rotation of shaft 18 at the same time as drum 30 is indexed. For this purpose a vertical shaft 36 is geared to the right-hand end of shaft 18 and extends upwardly therefrom in housing 14 to drive the rotary index drive shaft 37 by the beveled gears 38.

The index drive shaft 37 extends forwardly parallel to the ways 10 and its forward end is splined to and telescoped by an indexing tubular shaft 39 journaled in bearings in carriage 3.

The turret 11 is mounted for rotation on an upstanding base 40 on carriage 3. For this purpose the base 40 has a cylindrical flange 41 with a vertical opening and having its upper end tapered to provide a conical seat 42 for centering the turret thereon. A central vertical spindle 43 is secured at the lower end on the sleeve-like flange 41 and extends upwardly through the bottom 44 of the turret to support a bearing 45 therefor.

The bottom 44 of turret 11 has a downwardly depending cylindrical sleeve 46 fitting around the spindle 43. A cylindrical bearing member 47 is secured on bottom 44 for containing bearing 45.

The turret 11 has a generally hexagonally shaped upstanding rim 48 for the attachment of various working tools for the lathe, the sides of the rim determining the several index positions for the turret, each with one side facing the lathe spindle.

The turret 11 is supported on base 40 by means of an outer circular flange member 49 extending downwardly from bottom 44 beneath rim 48 and bearing upon a corresponding complementary circular bearing surface 50 on the base 40. The member 49 has an outwardly tapered circumferential flange 51, and bearing surface 50 has a corresponding complementary outwardly tapered circumferential flange 52. The tapered flanges 51 and 52 are secured together by a clamping ring 53 having a tapered inner recess or groove for receiving the flanges.

The band 53 extends around the turret 11 and base 40 enclosing the flanges 51 and 52, and has its ends pivotally secured to a vertically disposed rotary shaft 54 located in a corner of extension base 40 and driven directly from indexing shaft 39 by the worm gear 55 on the latter meshing with a gear 56 on shaft 54.

The vertical shaft 54 has an eccentric upper crank member 57 supporting an opposite eccentric crank pin 58, and the opposite ends of band 53 are pivotally secured to the corresponding cranks 57 and 58 so that upon rotation of shaft 54 by the indexing shaft 39 the eccentric cranks first loosen the band 53 releasing the turret for indexing and then tighten the band 53 to secure the turret in an operating position to which it has been indexed.

The indexing of turret 11 by rotation of shaft 39 is effected by a Geneva movement disposed in the top of base 40 beneath the bottom plate 44 of the turret. The Geneva movement comprises a rotary member 59 disposed vertically in base 40 and of substantial diameter with an eccentric pin 60 mounted on its upper end and extending into a cam track 61 provided on the bottom of plate 44 and shaped to effect rotation of turret 11 upon rotation of member 59.

The cam track 61 is formed by a plurality of cam plates 62 bolted to the bottom of plate 44 of turret 11 and angularly shaped to provide a separate radial groove or cam track section between each adjacent plate and a curved groove or cam track section joining each pair of radial cam track sections at the base of each plate near the spindle 43. Each plate 62 has an upwardly extending dowel 63 passing through a corresponding hole in plate 44 to take the load from the securing bolts during rotation of the turret by pin 60.

The member 59 is disposed on a radius from the center of turret 11 substantially at right angles to the longitudinal center line of the turret so that when the turret is indexed and a face thereof is operatively positioned facing the spindle 7 the pin 60 is close to spindle 43 and in the circular or curved section of a cam track.

When the member 59 is rotated the pin 60 travels from a curved section of the cam track to a radial section thereof and outwardly in the latter section and then inwardly therein to the next curved section of the cam track, and in doing so the pin 60 acting on the adjacent plates 62 causes a rotation of turret 11 to present the next face in line with spindle 7.

The acceleration and deceleration of the turret 11 in its rotary movement is gradual by reason of the gradual merger of the curved and radial sections of the cam track 61 and the curved path of movement of pin 60. The pin 60 is free from stress when the turret 11 is in indexed position by reason of the fact that the pin is disposed stationary in the center of the curved section of cam track 61 where the walls of the track face only radially of the turret and there is no tendency for the pin to effect rotary movement of the turret or to hold the same against rotation.

The member 59 is rotated by indexing shaft 39 through the beveled gear 64 on the end of the shaft which meshes with the gear 65 on the lower end of the member 59.

A locking pin 66 accurately locates turret 11 in its several operating positions. For this purpose the locking pin 66 is vertically mounted in base 40 and extends upwardly into a recess 67 in the bottom of the corresponding plate 62 beneath the dowel 63 where it interlocks with the plate and holds the turret accurately indexed during tightening of the clamp band 53.

The locking pin 66 is released, simultaneously with the loosening of clamp 53, by means of cam 68 on member 59. For this purpose a cross rack 69 is disposed radially of member 59 and has a cam follower 70 engaging cam 68. An adjustable spring 71 is disposed at the outer end of rack 69 and biases the same toward the member 59 so that the cam 68 operates against the spring in moving the rack 69.

Gear teeth on rack 69 mesh with gear 72 on a cross shaft 73 extending to a position adjacent to pin 66, and a gear 74 on shaft 73 meshes with gear teeth 75 on the pin 66. The pin 66 is supported and pressed vertically upward by a spring 76 in the base 40.

When the member 59 is rotated, cam 68 pushes rack 69 outwardly against spring 71, thereby rotating shaft 73 and pulling locking pin 66 downwardly against spring 76 to release the locking pin from recess 67 and free turret 11 for turning. A radial drop in the cam 68 near the opposite side of member 59 provides for insertion of the locking pin 66 in the next recess 67 under the biasing influence of spring 71 and spring 76 as soon as member 59 has turned the turret to the next indexing position.

In summary, when carriage 3 moves to the rear end of bed 1 the trip rod 24 presses lever 22 closing the clutch 15 and thereby effecting rotation of shaft 18 by the traverse shaft 19 from motor 8. Rotation of shaft 18 causes a corresponding rotation of the indexing shaft 39 which then loosens clamp 53 by means of worm gear 55 and cranks 57 and 58, withdraws locking pin 66 by means of cam 68, rack 69 and shaft 73, and rotates turret 11 to the next index position by means of member 59, eccentric pin 60 and cam track 61.

As pin 60 approaches its dead center stationary position in cam track 61, cam 68 lowers allowing spring 71 to push rack 69 inwardly and spring 76 to push locking pin 66 upwardly into locking position to locate turret 11, and eccentric cranks 57 and 58 operate to tighten clamp ring 53 to secure the turret against further turning.

Rotation of shaft 39 is stopped by the trip mechanism 16, previously described, which effects disengagement of clutch 15 upon completion of the rotation required to effect locking and clamping of the turret 11.

If desired, the shaft 18 may also be employed to index a stop rod for the turret carriage. For this purpose a rotary stop rod 77 is rotatably mounted within bed 1 parallel to the ways 10. A series of stops 78 are adjustably carried by the stop rod and circumferentially spaced around the same to provide a separate stop disposed vertically above the rod for each operative face of the turret 11.

A stop strap 79 is disposed on carriage 3 to engage the operative stop 78 and prevent further forward movement of the carriage. Preferably the stops 78 are positioned to allow stopping of the carriage feed by the cam control on drum 30, and the stops are only employed for emergency purposes. The feed of carriage 3 being hydraulic, the stops 78 function directly as abutments preventing further feed of the carriage beyond the predetermined point set.

The stop rod 77 is rotated to present successive stops 78 in operative position in correlation to the indexing of the turret 11. This is accomplished by the worm gear 80 on vertical shaft 36 meshing with intermediate gear 81 mounted for rotation in housing 14 and which in turn drives gear 82 on the rear end of the stop rod 77. The gear reduction provided is such as to effect turning of stop rod 77 through approximately one-sixth of a revolution when turret 11 is turned the same angular amount.

The invention provides a power indexing mechanism that relieves the carriage drive of load during indexing and efficiently and accurately effects all of the movements required in a short time cycle and a predetermined sequence and correlation.

Various embodiments of the invention may be employed within the scope of the claims.

We claim:

1. In an automatic turret lathe having a bed with a headstock at one end and a turret carriage thereon adjacent the other end, a housing at the end of said bed adjacent said carriage, a rotary shaft extending into said housing from the opposite end of the bed, a turret indexing mechanism carried by said turret carriage, drive mechanism disposed in said housing, a splined shaft connecting said drive mechanism to said indexing mechanism, and clutch mechanism in said housing for operating said drive mechanism from said rotary shaft in correlation to the movement of said carriage.

2. In an automatic turret lathe having a bed with a headstock at one end and a turret carriage thereon adjacent the other end, a housing at the end of said bed adjacent said carriage, a rotary shaft extending into said housing from the opposite end of the bed, a turret indexing mechanism carried by said turret carriage, drive mechanism disposed in said housing and telescopically connected to said indexing mechanism to drive the same, clutch mechanism in said housing for operating said drive mechanism from said rotary shaft, and means automatically operating said clutch mechanism in response to the movement of said turret carriage.

3. In an automatic turret lathe having a bed with a headstock at one end and a turret carriage thereon adjacent the other end, a housing at the end of said bed adjacent said carriage, a rotary shaft extending into said housing from the opposite end of the bed, a turret indexing mechanism carried by said turret carriage, drive mechanism disposed in said housing and telescopically connected to said indexing mechanism to drive the same, clutch mechanism in said housing for operating said drive mechanism from said rotary shaft, a lever in said housing for operating said clutch mechanism in response to the rearward movement of said carriage to index the turret, and an automatic trip for releasing said lever and opening the clutch upon a predetermined operation of said drive mechanism sufficient to complete the indexing of the turret.

4. In a lathe, a turret, a bed, a carriage movable on said bed and rotatably supporting said turret, a locking pin for said turret, a clamp ring for said turret, indexing means for said turret including substantially vertical stub shafts supported in said carriage for operating said locking pin, clamp ring and indexing means, a housing at the end of said bed adjacent said carriage, a single substantially horizontal indexing shaft extending into said carriage from said housing and carrying longitudinally spaced gears for operating said stub shafts, clutch and drive means supported in said housing to operate said indexing shaft, and means operated by movement of said carriage to operate said clutch in correlation to the operating cycle of said carriage.

5. In a lathe, a turret, a bed, a carriage movable on said bed and rotatably supporting said turret, a locking pin for said turret, a clamp ring for said turret, indexing means for said turret including stub shafts supported in said carriage for operating said locking pin, clamp ring and turret, a single indexing shaft extending into said carriage to operate said stub shafts, clutch and drive means supported on said bed to operate said indexing shaft, means operated in response to movement of said carriage to operate said clutch in correlation to the operating cycle of said carriage, and variable rotary stop means operated by the drive means to regulate predetermined cyclic movement of said carriage.

6. In a lathe, a turret, a bed, a carriage movable on said bed and rotatably supporting said turret, a locking pin for said turret, a clamp ring for said turret, a Geneva movement disposed beneath the turret to rotate the same to its several indexed positions, a pair of substantially vertical stub shafts in said carriage, eccentrics carried by said stub shafts to respectively operate said clamp ring and Geneva movement, a cam carried by the stub shaft for said Geneva movement to operate said locking pin, a single substantially horizontal indexing shaft extending into said carriage and carrying longitudinally spaced gears to operate said stub shafts, clutch and drive means supported on said bed to operate said indexing shaft, and means operated in response to movement of said carriage to operate said clutch in correlation to the operating cycle of said carriage.

L. E. GODFRIAUX.
CHARLES H. JOHNSON.

References Cited in the file of this patent

UNITED STATES PATENTS

| Number | Name | Date |
|---|---|---|
| 496,065 | Richards | Apr. 25, 1893 |
| 707,327 | Hormby | Aug. 19, 1902 |
| 991,886 | Potter et al. | May 9, 1911 |
| 1,074,561 | Potter et al. | Sept. 30, 1913 |
| 1,099,308 | Millholland | June 9, 1914 |
| 1,484,603 | Chapman | Feb. 19, 1924 |
| 1,813,484 | Class | July 7, 1931 |
| 1,934,358 | Kylin | Nov. 7, 1933 |
| 1,961,522 | Nenninger | June 5, 1934 |
| 1,988,675 | Tessky | Jan. 22, 1935 |
| 2,011,486 | Kingsbury | Aug. 13, 1935 |
| 2,135,639 | Gorham | Nov. 8, 1938 |
| 2,358,503 | Godfriaux | Sept. 19, 1944 |
| 2,392,228 | Casella et al. | Jan. 1, 1946 |
| 2,395,696 | Sundt | Feb. 26, 1946 |